United States Patent [19]
Mormile et al.

[11] Patent Number: 5,990,243
[45] Date of Patent: Nov. 23, 1999

[54] POLYUROXY SEALER PREPARED FROM EPOXY RESIN, ALDIMINE OR KETIMINE AND POLYISOCYANATE

[75] Inventors: Patrick J. Mormile, Bowling Green, Ohio; Rajnikant Shah, Ahimedabad, India; Larry E. Thieben, Waterville, Ohio

[73] Assignee: BASF Corporation, Southfield, Mich.

[21] Appl. No.: 08/987,094

[22] Filed: Dec. 8, 1997

Related U.S. Application Data

[60] Provisional application No. 60/034,524, Dec. 30, 1996.

[51] Int. Cl.$^6$ .............................. C08L 33/14; C08L 63/00; C08L 67/02
[52] U.S. Cl. ............................ 525/111; 525/438; 525/528
[58] Field of Search ..................................... 525/528, 111, 525/438

[56] References Cited

U.S. PATENT DOCUMENTS

| | | | |
|---|---|---|---|
| 3,993,708 | 11/1976 | Brinkmann et al. | 260/830 |
| 4,310,646 | 1/1982 | Kempter et al. | 525/528 |
| 4,433,078 | 2/1984 | Kersten et al. | 523/403 |
| 5,214,086 | 5/1993 | Mormile et al. | 524/237 |
| 5,262,465 | 11/1993 | Ott et al. | 523/415 |

FOREIGN PATENT DOCUMENTS

| | | |
|---|---|---|
| 4442149 | 5/1996 | Germany . |
| 2-045518 | 8/1988 | Japan . |
| 7-097559 | 4/1995 | Japan . |

*Primary Examiner*—Robert E. Sellers

[57] ABSTRACT

A coating composition useful as a sealer comprises an epoxy resin, an aldimine or ketimine, a polyisocyanate hardener and a hydroxyl containing compound such as a polyester or acrylic polyol.

7 Claims, No Drawings

POLYUROXY SEALER PREPARED FROM EPOXY RESIN, ALDIMINE OR KETIMINE AND POLYISOCYANATE

This application claims the benefit of Provisional Application, Serial No. 60/034,524, with a filing date of Dec. 30, 1996.

FIELD OF THE INVENTION

The present invention is directed to novel coating compositions. In particular, the present invention is directed to coating compositions that comprise an epoxy resin, imine (preferably ketimine), polyisocyanate and hydroxyl compound. The compositions have been found to be excellent sealer compositions, are tintable, and are preferably applied, wet on wet, utilizing a basecoat/clearcoat or single stage topcoat over them.

BACKGROUND OF THE INVENTION

With increasing Volatile Organic Content (VOC) restrictions, it is difficult to get a balance of pot life and dry time for coatings useful in refinish paint compositions. The main problems have been that the hydroxyl functional polyols are generally high molecular weight resins, which are viscous materials and require a lot of organic solvents in order to reduce to sprayable viscosities. It is also difficult to get the VOC low enough to be compliant with environmental restrictions. By using reactive diluents in combination with the polyol and isocyanates, lower VOC can be achieved. An excellent example of this type coating is exemplified in U.S. Pat. No. 5,214,086 and is assigned to BASF Corporation.

In the prior art, the use of diketimines, dialdimines, and hindered diamines as reactive diluents, helps to lower the viscosity and increase the solids, thus enabling coating compositions to reach required VOC limits. However, as more stringent VOC limits are being set, it has become necessary to try and achieve even lower VOCs. The use of low molecular weight hydroxyl functional polyols are difficult to use in order to reach these VOC limits. In addition, these polyols react too fast and a sufficient pot life is difficult to achieve.

An approach to a coating composition has been to mix epoxy/amine reactants with isocyanate reactants but the amine from the epoxy reaction reacts exceedingly fast with the isocyanate, leaving only an epoxy group and an hydroxyl group which do not react under ambient conditions.

We have now found that polyuroxy coating compositions overcome the prior art disadvantages and result in low VOC coatings that are especially useful as refinish paint compositions The present invention is directed to novel coating compositions. In particular, the present invention is directed to coating compositions that comprise an epoxy resin, imine, (preferably ketimine), polyisocyanate and an active hydrogen containing compound. Coating compositions have been found to be excellent sealer compositions, are tintable, and are preferably applied wet on wet utilizing a basecoat/ clearcoat or single stage topcoat over them.

SUMMARY OF THE INVENTION

The present invention relates to the use of polyuroxy in coating systems especially coatings suitable for the production of paint for the Automotive industry. The coatings can be cured at ambient conditions or can be cured by baking and are therefore useful in refinish paint compositions. The coating composition optionally contains pigments and other well known paint additives such as fillers, rheology control agents, dispersing agents, solvents, etc.

The coating composition comprises:

a) at least one epoxy functional compound;

b) an imine functional compound c) at least one isocyanate functional resin and optionally an active hydrogen containing compound.

The coating composition can be low in volatile organic content (VOC), but the invention is not limited to only low VOC compositions. The invention also relates to the reaction behavior of the coating composition being moisture dependent, but moisture is not essential for the reaction. The invention also relates to optionally using catalysts to accelerate the reaction rate of the active hydrogen compound or the imine functional compound with the isocyanate compounds. The catalysts used in this invention are aromatic or aliphatic carboxylic acids or organic tin based compounds as described in the cited prior art. The use of moisture scavengers is optional in order to control the reaction rates in humid conditions.

DETAILED DESCRIPTION OF THE INVENTION

The present invention relates to the use of polyuroxy in coating systems especially coatings suitable for the production of paint for the automotive industry. The coatings can be cured at ambient conditions or can be cured by baking and are therefore useful in refinish paint compositions. The coating composition optionally contains pigments and other well known paint additives such as fillers, rheology control agents, dispersing agents, solvents, etc.

The coating composition comprises:

a) at least one epoxy resin;

b) an imine functional compound c) at least one polyisocyanate and optionally an active hydrogen containing compound.

This invention also describes a method for reducing the volatile organic content (VOC) of a paint composition, by increasing the solids in a paint composition without adversely affecting the application, durability or performance of the composition.

Useful epoxy resins are those which react with amine functional compounds under ambient or bake conditions. The diglycidyl ether of bisphenol A advanced with bisphenol A as exemplified by Dow DER 663U is a suitable species. Optionally, these epoxies may be reactive with other active hydrogen containing compounds.

Useful isocyanates are di- or polyisocyanates which are aliphatic, cycloaliphatic, or aromatic. Such isocyanates include hexamethylene diisocyanate, 1-methyl-2,4-diisocyanatocyclohexane, isophorone diisocyanate,4,4-diisocyanatodicyclohexyl methane, toluene-2-4-diisocyanate, o-, m-, and p-xylene diisocyanate, 1-5-naphthalene diisocyanate or mixtures thereof. It is also possible to use polyisocyanates with isocyanurate, allophanate, biuret or uretdione structures. The polyisocyanates may optionally be reacted with a deficit of polyhydroxy compounds, such as water, glycols, polyalkylene glycols, neopentyl glycols, glycerol, trimethylol propane, hexane triol, or alkyd resins, before being used.

This invention also relates to a process of formulating coatings by using aldimine and ketimine. Typically, the aldimine does not completely hydrolyze into amine and aldehyde, but probably reacts with the isocyanate as the imine.

Useful hydroxyl containing compounds are acrylic polyols, polyester polyols and those known to the art.

The composition may also contain pigments. These pigments can be introduced by first forming a mill base with the epoxy functional compound or optionally with the imine by conventional techniques, such as sand grinding, ball milling, attritor grinding, or two roll milling to disperse the pigments. The mill base is blended with the film forming constituents as shown in the examples which follow.

The invention also relates to optionally using catalysts to accelerate the reaction rate of the epoxy imine and imine compounds with isocyanate compounds. The catalysts which may be in this invention are tin compounds.

The use of moisture scavengers is optional in order to control the reaction rates in humid conditions.

The use of moisture scavenging materials is optional in this application in order to control the water which is released from the pigments, especially in grinding. The removal of this water in the mill base helps to control the reaction rates of the coating composition and allow for the desired properties of the coating film.

Coating compositions described by the present invention find utility in application of ambient film forming and curing such as automotive refinish coatings. It is also suggested that the present invention applied to coatings to be force dried or baked to accelerate the coating curing process. Forced dry conditions range from 100 degrees Fahrenheit to over 325 degrees Fahrenheit. The coating cure process for the present invention may also be accelerated by the utilization of radiant heating or Infra Red emitting devices known to the art.

The following examples are intended to illustrate the invention. All quantities are shown on a weight bases unless otherwise indicated.

The following epoxy-isocyanate-imine-hydroxyl (polyuroxy) primer systems were made and achieved a 3.1 lbs. VOC or less and exhibited excellent adhesion, humidity resistance, salt spray resistance and chip resistance. The specific use as a tintable sealer is illustrated in the following examples, which use actual BASF Automotive Refinish Products to prepare the tinted Polyuroxy sealer. Two examples of a tinted sealer are provided. These examples are the prime embodiment of Polyuroxy as a tintable sealer. They are a red Polyuroxy tinted sealer and a yellow Polyuroxy tinted sealer. They are especially useful as a sealer under a poor hiding basecoat/clearcoat topcoat, or poor hiding single-stage topcoat. The examples illustrated here utilize a BASF Single-Stage Topcoat, HS SOLO.

EXAMPLE 1

TINTABLE POLYUROXY SEALER

|  | % By Volume |
|---|---|
| BASF White Epoxy Primer EP-689 | 33% |
| BASF Single-Stage Red Tint Base HS Solo HS-82 | 17% |
| BASF Ketimine Polyuroxy Activator-UA-97 | 33% |
| BASF Isocyanate Hardener-DH-46 | 17% |
|  | 100% |

This red polyuroxy sealer is indicative of the Formula cited as Example 3. This sealer was topocated with BASF HS SOLO Topcoat Red. Adequate topcoat color development was achieved with two coats of the single-stage topcoat, as measured by computer measurement of Delta E from the standard. Normally, if the H86404 Red Single Stage Topcoat were applied over an un-tinted Epoxy sealer, it would require 3–4 coats to achieve an adequate color match to the standard. Therefore, the use of the Polyuroxy technology as a tintable sealer saves time and money. It should be mentioned, that only one coat of Polyuroxy Sealer was applied.

EXAMPLE 2

TINTABLE POLYUROXY SEALER

|  | % by Volume |
|---|---|
| BASF White Epoxy Primer-EP 689 | 33% |
| BASF Single-Stage Yellow Tint Base-HS Solo-HS-62 | 17% |
| BASF Ketimine Polyuroxy Activator-UA-97 | 33% |
| BASF Isocyanate Hardener-DH-46 | 17% |
|  | 100% |

This yellow Polyuroxy tintable sealer is indicative of the Formula cited as Example 3. This sealer was topocated after 15–20 minutes flash off time, with BASF HS SOLO Single-stage Topcoat Yellow. One coat of Polyuroxy tintable sealer was applied, followed by 2 coats of H80755 single-stage yellow. At this point, adequate color development was achieved, as measured by computer measurement of Delta E from the standard. For comparison purposes, the same H80755 single-stage yellow topcoat was applied over a standard un-tinted epoxy primer, which was gray. In this case, it took 4 coats of the H80755 yellow to achieve adequate color match, to the standard.

In summary, the Polyuroxy technology allows the combination of Epoxy technology with hydroxyl functional resin systems, such as described in U.S. Pat. No. 5,214,086. This allows the epoxy component to be tinted any color, preferably to match closely to that of the topcoat, so that time (number of coats of topcoat) and money may be saved.

The role of the ketimine activator and isocyanate hardener, are especially important to the Polyuroxy technology, in that they allow the entire system to become an integrally crosslinked network.

THE FOLLOWING TWO EXAMPLES ILLUSTRATE THE ACTUAL POLYUROXY FORMATION

EXAMPLE 3

|  | % by weight |
|---|---|
| Epoxy Resin (DOW DER 663U) | 21.8 |
| Butyl Benzyl Phthalate (Monsanto Santicizer 160) | 5.7 |
| Ketimine Resin (Akzo Setalux K 7002 Bx-55) | 9.7 |
| Hydroxyl Acrylic Resin (BASF Acrylic) | 22.9 |
| Isocyanurate Trimer (Rhone-Poulenc Tolonate HDT) | 39.9 |
|  | 100.0 |

[1]Diglycidyl ether of bisphenol A advanced with bisphenol A

EXAMPLE 4

| | % by weight |
|---|---|
| Epoxy resin (SHELL Epon) | 16.8 |
| Epoxy ester resin (BASF Epoxy Ester) | 14.5 |
| Ketimine (BAYER) | 33.1 |
| Isocyanate Trimer (RHONE-POULENC Tolonate HDT-LV) | 9.6 |
| Isocyanate Trimer (BAYER) | 26.0 |
| | 100.0 |

We claim:

1. A sealer coating composition comprising the reaction product of:

(A) at least one epoxy resin
   (B) at least one ketimine,
   (C) a hardener comprising at least one polyisocyanate, and
   (D) at least one active hydrogen containing compound selected from the group consisting of polyester polyols and acrylic polyols.

2. The composition of claim 1 which is cured at ambient temperatures.

3. The composition of claim 1 which is baked to cure.

4. The composition of claim 1 that additionally contains at least one pigment.

5. The composition of claim 1 wherein the polyisocyanate is selected from the group consisting of aliphatic, aromatic and cycloaliphatic, diisocyanate, triisocyanates, polyisocyanates with uretdione, biuret or isocyanate structures, and mixtures thereof.

6. The composition of claim 5 wherein the isocyanate functional resin is a dimer or trimer of hexamethylene diisocyanate or a blend of both.

7. The composition of claim 1 wherein the epoxy resin is the diglycidyl ether of bisphenol A advanced with bisphenol A.

* * * * *